United States Patent
Garris et al.

(10) Patent No.: US 11,845,018 B2
(45) Date of Patent: Dec. 19, 2023

(54) METHOD FOR PREPARING A FOAM CONTROL COMPOSITION IN A GRANULAR OR A POWDER FORM

(71) Applicant: Elkem Silicones USA Corp., East Brunswick, NJ (US)

(72) Inventors: John P. Garris, Indian Land, SC (US); Michael Travis Hale, Easley, SC (US); Matthew Timmons, Charlotte, NC (US)

(73) Assignee: ELKEM SILICONES USA CORP., East Brunswick, NJ (US)

( * ) Notice: Subject to any disclaimer, the term of this patent is extended or adjusted under 35 U.S.C. 154(b) by 472 days.

(21) Appl. No.: 16/992,641

(22) Filed: Aug. 13, 2020

(65) Prior Publication Data

US 2021/0046403 A1 Feb. 18, 2021

Related U.S. Application Data

(60) Provisional application No. 62/886,666, filed on Aug. 14, 2019.

(51) Int. Cl.

| | |
|---|---|
| *B01D 19/04* | (2006.01) |
| *C08K 3/36* | (2006.01) |
| *C08L 25/18* | (2006.01) |
| *C08L 83/04* | (2006.01) |
| *C08J 3/12* | (2006.01) |
| *C08J 3/215* | (2006.01) |
| *C08L 33/08* | (2006.01) |
| *C11D 3/16* | (2006.01) |

(52) U.S. Cl.
CPC ....... *B01D 19/0409* (2013.01); *B01D 19/045* (2013.01); *B01D 19/0445* (2013.01); *B01D 19/0454* (2013.01); *C08J 3/122* (2013.01); *C08J 3/215* (2013.01); *C08K 3/36* (2013.01); *C08L 25/18* (2013.01); *C08L 33/08* (2013.01); *C08L 83/04* (2013.01); *C11D 3/162* (2013.01)

(58) Field of Classification Search
CPC ........ B01D 19/04–0495; C08J 3/12–18; C08J 3/215
See application file for complete search history.

(56) References Cited

U.S. PATENT DOCUMENTS

| | | | |
|---|---|---|---|
| 3,399,144 A | 8/1968 | Hathaway et al. | |
| 3,933,672 A | 1/1976 | Bartolotta et al. | |
| 4,419,260 A * | 12/1983 | Reuter ................... | C11D 3/225 510/438 |
| 4,652,392 A | 3/1987 | Baginski et al. | |
| 5,456,855 A | 10/1995 | De Cupere | |
| 5,767,053 A | 6/1998 | Germain et al. | |
| 5,861,368 A | 1/1999 | Kolaitis et al. | |
| 6,162,781 A | 12/2000 | Buscan et al. | |
| 6,165,968 A | 12/2000 | Lenoble | |
| 9,023,781 B2 | 5/2015 | Chi et al. | |
| 9,994,795 B2 | 6/2018 | Colson et al. | |
| 2009/0118399 A1* | 5/2009 | Benbakoura ............. | C11D 3/37 524/53 |
| 2013/0309498 A1* | 11/2013 | Chao ...................... | C11D 3/046 516/120 |
| 2014/0024571 A1* | 1/2014 | Creutz ................. | C11D 3/3738 510/347 |
| 2014/0336284 A1 | 11/2014 | Sakurai et al. | |
| 2016/0177225 A1 | 6/2016 | Colson et al. | |

FOREIGN PATENT DOCUMENTS

| | | | |
|---|---|---|---|
| EP | 0636684 A2 | 2/1995 | |
| WO | 9301269 A1 | 1/1993 | |
| WO | WO-2013181948 A1 * | 12/2013 | ......... B01D 19/0409 |

OTHER PUBLICATIONS

International Preliminary Report on Patentability for Application No. PCT/US2020/045772 dated Feb. 24, 2022.

International Search Report for Application No. PCT/US2020/045772 dated Nov. 12, 2020.

* cited by examiner

*Primary Examiner* — Stephen E Rieth

(74) *Attorney, Agent, or Firm* — MCBEE MOORE & VANIK IP, LLC

(57) ABSTRACT

The present disclosure generally relates to a method for preparing a powder or granular foam control compositions and methods for reducing or preventing or breaking foam in various applications such as powder detergents as well as coatings, cementing, concrete, gypsum board and other construction type applications or in some agricultural formulations like fertilizers, herbicides and pesticides.

6 Claims, No Drawings

METHOD FOR PREPARING A FOAM CONTROL COMPOSITION IN A GRANULAR OR A POWDER FORM

CROSS-REFERENCE TO RELATED APPLICATIONS

This patent application claims the benefit of U.S. Provisional Patent Application No. 62/886,666, filed 14 Aug. 2019. The disclosure of the priority application is incorporated in its entirety herein by reference.

This application is related to International Application No. PCT/US2020/045772, filed 11 Aug. 2020.

BACKGROUND

Field

The present disclosure generally relates to a method for preparing powder or granular foam control compositions and methods for reducing or preventing or breaking foam in various applications such as coatings, powder detergents, cementing, concrete, gypsum board and other construction type applications or in some agricultural formulations like fertilizers, herbicides and pesticides.

Description of Related Art

Foams are dispersions of gas bubbles in liquids or solid matrices. Surfactants or other surface-active ingredients such as detergents, wetting agents, emulsifiers, or dispersants which are commonly used in various industries lower the surface tension of a liquid and due to their amphiphilic nature tend to accumulate on air/liquid interfacial surfaces, retarding the coalescence of gas bubbles and hence stabilizing foams. Indeed, when a foam lamella is stretched, as the concentration of surfactant in the stretched zone decreases, it causes the surface tension to increase in said zone. In other words, the surfactant stabilizes the weakest parts, which is the stretched zone, of the foam bubble.

However, the formation of stable foam in excess causes problems in many industrial processes, affecting directly the quality of the final product, reducing the carrying capacity of containers or causing pumping problems, among others. For this reason, there is a constant need for foam control compositions to reduce substantially or eliminate the volume of undesired foam.

A foam control composition should exhibit pronounced surface-active properties and some other essential features are its capability to spread rapidly on the gas/liquid interface and to prevent (or reverse) the stabilizing properties of surfactants or surface-active ingredients on the foam bubbles. Most foam control compositions destabilize foams by involving processes based on pressure differences between different sized foam bubbles, drainage and rupture of the foam films.

Although aqueous liquid defoamers, primarily oil in water (O/W) emulsions, are predominantly used in many common applications and normal operating conditions, powder defoamers or powder foam control compositions are preferred, in some applications and especially in extreme climate conditions where temperatures can reach very low (<0° C.) and/or high (>40° C.) levels.

Powder foam control compositions are mixtures which have the appearance of solid or flowable powder where the active ingredients, often a liquid defoamer, is supported by a suitable solid inorganic or organic carrier.

Powder foam control compositions are usually prepared by adsorption of a foam control agent on a solid carrier often chosen from high surface area solid materials.

Powder foam control compositions have been around for more than 50 years primarily to control suds in detergent compositions like mineral oil compositions in U.S. Pat. No. 3,399,144.

Silicone-based powder compositions using simple water-soluble, organic and inorganic salts like sodium acetate, sodium citrate, sodium carbonate or sodium sulfate are disclosed in U.S. Pat. No. 3,933,672 for detergent compositions.

U.S. Pat. No. 4,652,392 discloses silicone compositions on water-soluble and water-dispersible polyethylene glycol with ethoxylated fatty acids. This prior art discloses the interactions between powder detergent components and powder silicone antifoams.

U.S. Pat. No. 5,456,855 discloses the use of starches as a solid carrier for silicone antifoams compositions in detergents with an organic coating.

Other compositions use a solid powder inorganic silicate material such as zeolite as disclosed in U.S. Pat. No. 5,767,053; however, this art discloses that silicones do not release well from inorganic silicate materials because they tend to stay bound on the substrate rather than release into water.

In U.S. Pat. Nos. 5,767,053, 5,861,368 and 6,165,968, the solid zeolite compositions are coated with a water-soluble polymeric dispersant that the inventors describe as a binder, said binder covers the solid surface such as zeolite, aluminosilicate, prior to adding surfactants and silicone materials so that the silicones are separated from the silicate surface and will release more effectively into water.

U.S. Pat. No. 6,162,781 used low density sodium carbonate as a solid carrier for foam control compositions, primarily silicone based, for use in powder detergent.

U.S. Pat. No. 9,023,781 used sulfate or carbonate or starch as a solid carrier to deposit a silicone emulsion on a granular defoamer.

U.S. Pat. No. 9,994,795 describes a method of forming an antifoam granule comprising a solid carrier and an antifoam emulsion deposited on the carrier, said method comprising the steps of:
I. providing an emulsion comprising:
  A. an oil phase comprising an antifoam compound, said antifoam compound comprising:
    1. a hydrophobic fluid having a surface tension of from 23 to 40 mN/m, and
    2. a hydrophobic filler dispersed in said hydrophobic fluid;
  B. an aqueous phase comprising:
    3. a binder which includes water-soluble or water-dispersible polymers, and
    4. water; and
  C. a silicone polyether;
II. contacting the emulsion with the carrier to deposit the antifoam compound on the carrier and form the antifoam granule.

Powder foam control compositions are used in many applications besides powder detergent including coatings, cementing, concrete, gypsum board and other construction type applications. They are also used in some agricultural formulations like fertilizers, herbicides and pesticides.

Nevertheless, powder foam control compositions most often show lower efficiency compared to the use of its active ingredient used in its liquid form and at the same concentration.

There exists, therefore, a significant need for an improved and highly effective foam control system in a powdered form. The present invention fulfills all these needs and provides further related advantages.

SUMMARY OF THE INVENTION

The present disclosure provides a method for preparing a foam control composition X in a granular or a powder form, said method comprising the steps of:
a) providing an aqueous dispersion, an aqueous solution or a concentrate in a liquid form comprising at least one water-soluble or water-dispersible organic polymer A bearing polyacid groups or polyamino groups which is partially salified, or fully salified;
b) mixing said aqueous dispersion, said aqueous solution or said aqueous concentrate comprising said water-soluble or water-dispersible organic polymer A with a foam control agent B which is provided either as a liquid concentrate, as an aqueous dispersion or as an emulsion, and wherein said components are added so that the water-soluble or water-dispersible organic polymer A to foam control agent B weight percent ratio is from 99.9:0.1 to 55:45, and
c) drying the resulting liquid mixture to recover the granular or powder foam control composition X comprising the polymer A and the foam control agent B wherein the water-soluble or water-dispersible organic polymer A to foam control agent B weight percent ratio is from 99.9:0.1 to 55:45.

The present disclosure also provides a method for reducing air entrainment in an aqueous medium of a coating, a cement, a concrete or a mortar composition, the process comprising addition of the granular or powder foam control composition X according to the invention to an aqueous medium, a coating, a cement, a concrete, or a mortar composition and reducing air entrainment relative to same medium without the granular or powder foam control composition X.

DETAILED DESCRIPTION OF THE INVENTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments and is not intended to be limiting. Instead, the scope of the present disclosure will be established by the appended claims.

All phrases comprising parentheses denote either or both of the included parenthetical matter and its absence. For example, the phrase "(meth)acrylate" includes, in the alternative, acrylate and methacrylate, and mixtures thereof.

As used herein, the term "polymer" refers, in the alternative, to a polymer made from one or more different monomers, such as a copolymer, a terpolymer, a tetrapolymer, a pentapolymer etc., and may be a random, block, graft, star, sequential or gradient polymer.

As used herein, the phrase "wt. %" stands for weight percent.

By "a water-dispersible organic polymer" is meant that the polymer will form a stable aqueous dispersion without the aid of an external surfactant when stirred in water.

As described above, the Applicant demonstrated, to its credit, entirely surprisingly and unexpectedly, that by mixing a foam control agent B, which is provided either as a liquid concentrate, as an aqueous dispersion or as an emulsion, with an aqueous solution or dispersion or a liquid concentrate comprising at least one polymer A which is a water-soluble or water-dispersible organic polymer bearing polyacid groups or polyamino groups which is partially salified, fully salified, within the claimed weight ratio of the polymer A to the foam control agent B, allows to prepare after the drying step a foam control composition X in a granular or a powder form.

This new method avoids the use of solid carriers such as zeolite, starch, sodium sulfate or sodium carbonate as described in the prior art and hence eliminates the need for spraying the foam control agent onto the solid carrier or immersing the solid carrier into the foam control agent provided as an aqueous emulsion as described in U.S. Pat. No. 9,994,795.

The present invention offers a new means to carry foam control compositions including silicone-based, non-silicone, or mixtures of silicone and non-silicone foam control compositions into aqueous systems using a defined amount of specific polymers which are water-soluble or water-dispersible organic polymers bearing polyacid groups or polyamino groups which are partially salified or fully salified. It has been surprisingly found that the liquid polymers according to the invention mixed with liquid foam control agents and after drying the mixture, form a dry, free-flowing particulate composition that effectively carry foam control compositions into aqueous systems.

As used herein, the terminology "salified" refers to the salt formed by the acid-base reaction between an acidic group on the polymer with a base or the salt formed by the base-acid reaction between a basic (amine) group on the polymer with an acid.

By "free-flowing particulate" form, it is typically meant that the composition is in the form of separate discrete particles.

In a preferred embodiment, the polymer A to foam control agent B weight percent ratio is from 99.9:0.1 to 55:45, preferably from 99:1 to 60:40 and most preferably from 99:1 to 65:35.

In a preferred embodiment, the control agent B is free of said polymer A.

Polymers which are water soluble and water dispersible encompass a broad spectrum of chemistries used in many different industries and numerous applications. Dispersant polymers may be based on either synthetic or natural materials or a combination thereof. The key performance attribute is that the polymer should be partially or fully neutralized to form a salt that can be dried into a powder. If the polyacid or polyamino portion of the polymer is not partially salified or fully salified, it will, in general, not dry and hence will not yield particles or powder. The polymer may be partially or fully salified at the manufacturer or partially or fully salified in situ.

Synthetic ethylenically unsaturated monomers can be formed into homopolymers, copolymers and multipolymers, any multiple of 3 or higher monomers, as defined herein. These ethylenically unsaturated monomers are generally based on synthetic raw materials and derivatives. Some of these dispersant polymers are exemplified in U.S. Pat. Nos. 4,351,796, 4,711,725, 4,745,154, 4,885,097, 5,300,679 and may be homopolymers, copolymers, or multipolymers.

Synthetic water soluble and/or water dispersible polymers are composed of a myriad of ethylenically unsaturated monomers and oligomers. These monomers or oligomers may be polymerized into either randomized or block polymers. Monomers, once polymerized, may be generally classified into 3 basic functionalities anionic (acidic), cationic (alkaline) and nonionic and/or hydrophobic. Any single or multiple combination of these functionalities can be utilized by the instant invention.

In a preferred embodiment of the invention, the polymer A is a water-soluble or water-dispersible organic polymer bearing polyacid groups which are partially salified or fully salified and for which the corresponding salts of said polyacid groups are chosen from the group consisting of carboxylate (—COO$^-$), phosphonate (—PO$_3$H$^-$ or —PO$_3{}^{2-}$), sulfonate (—SO$_3{}^-$) and phosphate (HPO$_4{}^{2-}$, NaH$_2$PO$_4{}^-$ and Na$_3$PO$_4{}^{3-}$) salts.

In another preferred embodiment, the polymer A further contains a plurality of aromatic rings.

Examples of polymers suitable for the invention such as dispersant anionic ethylenically unsaturated monomers below are meant to be exemplary, and not limiting to the inventive compositions. The anionic moiety can be a carboxylic acid, dicarboxylic acid, sulfonic acid, phosphoric acid, or phosphonic acid containing monomer or any combination thereof. The anionic acid moiety is, in general, a partially or fully neutralized salt using any neutralizing cation such as, but not limited to, hydroxides of sodium, potassium, calcium, magnesium, lithium, beryllium and the like. Cationic amines such as ammonia/ammonium hydroxide, mono, di and triethanolamines (MEA, DEA and TEA), monomethyl, monoethyl, monopropyl, isopropyl amine (IPA) and the like. Suitable dispersant polymers can be purchased.

Some exemplary synthetic ethylenically unsaturated carboxylic acid monomers include but are not limited to acrylic acid, methacrylic acid, ethacrylic acid, cyanoacrylic acid, sorbic acid, cinnamic acid, aconitic acid, glutaconic acid, mesoaconic acid, muconic acid, angelic acid, crotonic acid, tricarboxy ethylene, 2-acryloxypropionic acid, itaconic acid, fumaric acid, maleic acid, anhydrides thereof.

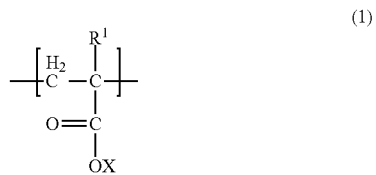
(1)

Exemplary monomeric, carboxylic acid structure (1) with R$^1$ being H, C$_1$ to C$_{30}$ and X being a cation of sodium, potassium, calcium, magnesium, lithium, beryllium, ammonium, monoethanolamine (MEA), diethanolamine (DEA), triethanolamine (TEA) and isopropanol amine (IPA) and the like.

With acrylic and methacrylic being most preferred monomer and sodium and potassium being most preferred salts.

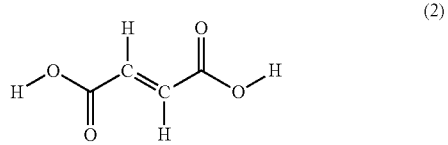
(2)

Exemplary dicarboxylic acid monomeric structures being a partially or fully neutralized salt where the cation is sodium, potassium, calcium, magnesium, lithium, beryllium, ammonium, MEA, DEA, TEA and IPA and the like. The sodium and potassium salts of maleic acid being most preferred.

Some exemplary synthetic ethylenically unsaturated sulfonic acid monomers include but are not limited to 2-acrylamido-2-methyl propane sulfonic acid (AMPS), 3-allyloxy-2-hydroxypropane sulfonic acid, vinyl sulfonic acid, styrene sulfonic acid, naphthalene sulfonic acid other alkyl, aryl or alkyl-aryl sulfonic acids.

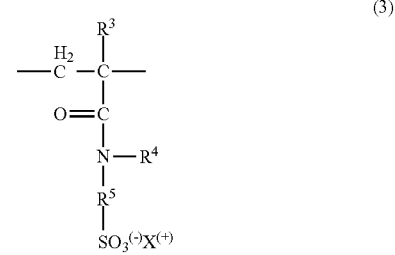
(3)

Exemplary sulfonic acid monomers structures (3) include but are not limited to alkyl and aryl acrylamido sulfonic acids being a partially or fully neutralized salt where the cation is sodium, potassium, calcium, magnesium, lithium, beryllium, ammonium, MEA, DEA, TEA and IPA and the like. The sodium and potassium salts with 2-acrylamido-2-methyl propane sulfonic acid (AMPS) being preferred. In the case above, R$^3$ is hydrogen or methyl, R$^4$ is hydrogen or C$_1$ to C$_4$ alkyl, R$^5$ is C$_1$ to C$_8$ alkyl or C$_8$ to C$_{10}$ arylalkyl, X being a cation of sodium, potassium, calcium, magnesium, lithium, beryllium, ammonium, MEA, DEA, TEA and IPA and the like.

In the case above, the sodium and potassium salts with 2-acrylamido-2-methyl propane sulfonic acid (AMPS) being preferred.

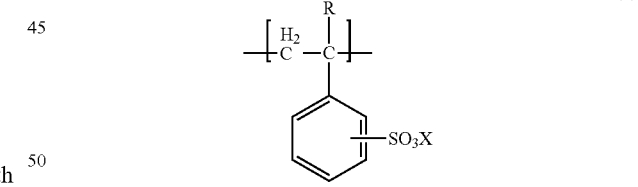
(4)

Another exemplary sulfonic acid monomer includes styrene sulfonic acids being a partially or fully neutralized salt where the cation is sodium, potassium, calcium, magnesium, lithium, beryllium, ammonium, MEA, DEA, TEA and IPA and the like. The sodium and potassium salts with styrene sulfonic acid being preferred. In the case above (chemical structure (4)): R is hydrogen or C$_1$ to C$_6$, SO$_3$ is at the 3 or 4 position, X being a cation of sodium, potassium, calcium, magnesium, lithium, beryllium, ammonium, MEA, DEA, TEA and IPA and the like.

Example dispersant cationic ethylenically unsaturated monomers below are meant to be exemplary, and not limiting to the inventive compositions. The cationic moiety can be a quaternary salt of dimethylaminoethylacrylate, dimethylaminoethylmethacrylate, dimethylaminomethylmethacrylate, diethylaminoethylmethacrylate, dimethylaminohydroxypropyl methacrylate, dimethylaminohydroxypropylacrylate, dimethylaminopropyl acrylamide, dimethylaminopropyl methacrylamide, methacryloyloxyethyltrimethylammonium, acryloyloxyethyltrimethylammonium, acrylamidopropyltrimethylammonium methacrylamidopropyltrimethylammonium and diallyldimethyl ammonium monomers or any combination thereof.

Some exemplary cationic polymers may include, for example, at least one of poly(diallyldimethyl ammonium chloride; poly[bis(2-chloroethyl) ether-alt-1,3-bis[3-(dimethylamino)propyl]urea]; ethanol, 2,2',2"-nitrilotris-, polymer with 1,4-dichloro-2-butene and N,N,N',N'-tetramethyl-2-butene-1,4-diamine; a hydroxyethyl cellulose dimethyl diallylammonium chloride copolymer; a copolymer of acrylamide and diallyldimethylammonium chloride; a copolymer of acrylamide and quaternized dimethylammoniumethyl methacrylate; a copolymer of acrylic acid and diallyldimethylammonium chloride; an acrylamide-dimethylaminoethyl methacrylate methyl chloride copolymer; quaternized hydroxyethyl cellulose; a copolymer of vinylpyrrolidone and quaternized dimethylaminoethyl methacrylate; a copolymer of vinylpyrrolidone and quaternized vinylimidazole; a copolymer of vinylpyrrolidone and methacrylamidopropyl trimethylammonium; poly(2-methacryloxyethyltrimethylammonium chloride); poly(acrylamide 2-methacryloxyethyltrimethyl ammonium chloride); poly[2-(dimethylamino)ethyl methacrylate) methyl chloride]; poly[(3-acrylamidopropyl) trimethylammonium chloride]; poly[(3-methacryl amidopropyl) tri methyl ammonium chloride]; poly[oxyethylene(dimethylimino)ethylene (dimethylimino)ethylene dichloride]; a terpolymer of acrylic acid, acrylamide and diallyldimethylammonium chloride; a terpolymer of acrylic acid, methacrylamidopropyl trimethylammonium chloride, and methyl acrylate, a terpolymer of vinyl caprolactam, vinylpyrrolidone, and quaternized vinylimidazole; poly(2-methacryloxyethyl phosphorylcholine-co-n-butyl methacrylate); poly[(dimethylamino)ethyl acrylate benzyl chloride quaternary salt (PDMAEA-BCQ); and poly[(dimethylamino)ethyl acrylate methyl chloride quaternary salt (PDMAEA-MCQ).

The cationic quaternary ammonium moiety is, in general, a partially or fully neutralized salt using any neutralizing anion such as, but not limited to, chloride, bromide, fluoride, iodide, acetate, formate, oxalate, benzoate, sorbate, lactate, citrate, isocitrate, glyoxalate, glycolate, propanoate, pyruvate, acrylate, hydroxyacetate, butanoate, tartrate, glutarate, caproate, phosphate, sulfate, nitrate, and the like.

Examples of polymers such as dispersant nonionic or hydrophobic ethylenically unsaturated monomers below are meant to be exemplary, and not limiting to the inventive compositions. The nonionic or hydrophobic moiety can include styrene, α-methyl styrene, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenyl butyl) styrene. Combinations of hydrophobic monomers can also be used.

Examples of optional non-ionic monomers include $C_1$-$C_{30}$ alkyl esters of acrylic or methacrylic acid and the alkali or alkaline earth metal or ammonium salts thereof, acrylamide and the $C_1$-$C_{30}$ alkyl-substituted acrylamides, the N-alkyl-substituted acrylamides and the N-alkanol-substituted acrylamides, hydroxyl alkyl acrylates and acrylamides. Also useful are the $C_1$-$C_{30}$ alkyl esters and $C_1$-$C_{30}$ alkyl half-esters of unsaturated vinylic acids, such as maleic acid and itaconic acid, and $C_1$-$C_{30}$ alkyl esters of saturated aliphatic monocarboxylic acids, such as acetic acid, propionic acid and valeric acid. The preferred nonionic monomers are selected from the group consisting of acrylamide, methacrylamide, methyl methacrylate, methyl acrylate, hydroxyethyl (meth)acrylate and hydroxypropyl (meth)acrylate.

Combinations of natural polymers and synthetic polymers, hybrid copolymers, are also advantageous in the instant invention. U.S. Pat. Nos. 5,223,171, 5,227,446, 5,296,470, 5,854,191, 7,595,007, 9,109,068, and 9,994,767 describes reaction products of synthetically modified naturally occurring oligomer or polymer and a synthetically derived oligomer or polymer moiety. These hybrid copolymers and terpolymers are useful in the instant invention.

Natural polymers and derivatives of natural polymers can also be used with the instant invention. Polymers of polyaspartic acid, amino acid polymers, generated from either synthetic or natural raw materials are useful in the instant invention. These can be homopolymers, copolymers or multipolymers as described in U.S. Pat. No. 7,091,305.

Lignin is a natural polymer derived from the papermaking process. Lignin can be converted into soluble derivatives either in situ in the sulfite papermaking process or by sulfonating lignin directly from the Kraft process. Lignosulfonate is an example natural polymer derivative of lignin which can be a sodium, potassium, calcium, magnesium, ammonium or other cation salt. The calcium, ammonium and sodium salts of lignosulfonate are preferred in the instant invention.

In a preferred embodiment of the invention, the polymer A is chosen from the group consisting of lignosulfonate salts, copolymers of acrylic acid and 2-acrylamido-2-methylpropanesulfonic in their corresponding partially or fully salified forms, copolymers of acrylic acid and styrene sulfonate in their corresponding partially or fully salified forms, and their mixtures.

Many different chemistries can be used as a foam control agent B, for example foam control organic materials like fatty acid esters, fatty alcohol alkoxylates, vegetable oils, mineral oils and polyglycols and the like are common materials. These organic constituents can be used alone or in conjunction with hydrophobic, by in-situ or by fluidization treatment, precipitated and/or fumed silica or other hydrophobic fillers including organic waxes or other hydrophobic treated inorganic fillers. These materials can be used alone or formulated together.

Another foam control technology is silicone-based. Silicones can be used either alone or in conjunction with hydrophobic treated fillers as described above. The primary silicone component in foam control agent B can be a linear, branched, pendant or block polymers or any combination. A typical foam control agent B can be made with polydimethylsiloxane (PDMS). Typical, linear polydimethylsiloxane foam control agents can contain from 0-40% of pretreated and/or in situ treated silica or other hydrophobic fillers; however, 4-10% silica is preferred. The silica can be fumed silica or precipitated silica, or in many cases a combination. Typical pretreated hydrophobic silicas include, but are not limited to PDMS, silanes, D4/D5, and HMDZ treatments, or combinations thereof. In situ hydrophobizing treatments can include, but are not limited to PDMS, silanes, D4/D5, MQ resins and HMDZ or combinations thereof and the like. Additionally, small amounts of other additives may be added such as stearic or palmitic acid.

Silicone polymers are a general term for a class of polymers that can be polydimethyl siloxane (PDMS) or other functional silicones including methyl, vinyl, hydroxyl, alkyl silicones, aryl silicones, alkylaryl silicones, amino silicones, polyether silicones, fluorosilicones and the like. Silicone polymers can be used as linear, branched, pendant or block polymers. Branched polymers can be produced for example using a polycondensation type reaction of a hydroxyl MQ resin, PDMS silicone polymer and PDMS silicone polymers containing hydroxyl functionality or a mixture of hydroxyl functional silicone polymers or a hydroxyl functional silicone and methyl hydrogen containing polymers. Branched polymers can also be produced using a polyaddition type reaction of a pendant, end-chain or combination of pendant and end chain methyl hydrogen containing silicone polymers with any number of vinyl containing silicone polymers and/or MQ resins. These reactions are meant to be exemplary and not limiting to the invention in any way.

Foam control agents of the instant invention can contain combinations of both organic and silicone-based foam control agents. Powder foam control agents of the instant invention can be made from an antifoam concentrate containing 100% solids (no water) or from an antifoam emulsion that contains active antifoam in water. Suitable foam control agents are either those containing no water or those containing less than 60% by weight to 5% by weight of water. Those containing, less than 5% are the most preferred. Various powder foam control agents of the instant invention are laid out in the following examples.

In a preferred embodiment, the foam control agent B is selected from the group consisting of antifoaming agents based on silicone polymers; alkoxylated alcohols; ethylene oxide/propylene oxide block copolymers; organic esters of ethylene oxide/propylene oxide block copolymers; organic esters of polyethylene glycol; polypropylene glycol; mixtures of organic esters of polyethylene glycol and polypropylene glycol; hydrophobic silica; and mixtures thereof.

In another preferred embodiment, the foam control agent B is a silicone polymer in combination with a hydrophobic silica.

In another preferred embodiment, in step b) a surfactant is added to the mixture.

Examples of suitable surfactants may be chosen from anionic, cationic, nonionic, amphoteric or zwitterionic surfactants, and mixtures thereof. Examples of anionic surfactants include alkylbenzene sulphonates, particularly linear alkylbenzene sulphonates having an alkyl chain length of 8 to 16 carbon atoms; primary and secondary alkyl sulphates, particularly primary alkyl sulphates having an alkyl chain length of 8 to 16 carbon atoms; alkyl ethersulphates; olefin sulphonates; alkyl xylene sulphonates; dialkyl sulphosuccinates; and fatty acid ester sulphonates. Nonionic surfactants that may be used include the primary and secondary alcohol ethoxylates, especially aliphatic alcohols having 8 to 20 carbon atoms ethoxylated with an average of from 1 to 50 moles, preferably 2 to 25 moles, of ethylene oxide per mole of alcohol. Suitable non-ethoxylated nonionic surfactants include alkylpolyglycosides, glycerol monoethers, and polyhydroxyamides. Examples of cationic organic detergent surfactants include alkyl amine salts, quaternary ammonium salts, sulphonium salts and phosphonium salts.

In another preferred embodiment, in step b) a surfactant is added to the mixture. The surfactant can be a silicone surfactant. Any silicone surfactant structure including those with ethylene oxide, propylene oxide or butylene oxide and the like. The structures can be pendant or block and/or both.

In exemplary embodiments, in step b) one or more excipients, diluents or additives as necessary or desired are added to the mixture. For example, an anti-caking agent may be added to prevent the formation of lumps and to further improve flowability, packaging and storage of the granular or powder foam control composition X. Various inorganic or organic anti-caking agents may be used including but not limited to talc, calcium silicate, magnesium silicate, powdered cellulose, starch, magnesium sulfate and such.

Example powder antifoams can be dried using a conventional laboratory rotary evaporator (rotavap) and an oil bath at 105° C. to dry the materials. Drying can be done by any conventional or unconventional process for example spray drying, fluidized bed drying and the like.

In a preferred embodiment, a spray dryer is used in step c) for drying the resulting mixture.

Another object of the invention relates to a granular or powder foam control composition X comprising a water-soluble or water-dispersible organic polymer A and a foam control agent B wherein the water-soluble or water-dispersible organic polymer A to foam control agent B weight percent ratio is from 99.9:0.1 to 55:45 which is prepared by the method of the invention described above.

Another object of the invention relates to a method for reducing air entrainment in an aqueous medium, a coating, a cement, a concrete or a mortar composition, the method comprising adding the granular or powder foam control composition X according to the invention and as described above to an aqueous medium, a coating, a hydraulic cement, a concrete, or a mortar composition and reducing air entrainment relative to same medium without the granular or powder foam control composition X.

Another object of the invention relates to a liquid detergent comprising one or more surfactants, water and the granular or powder foam control composition X according to the invention and as described above.

Another object of the invention relates to a powder detergent comprising one or more surfactants, and the granular or powder foam control composition X according to the invention and as described above.

Another object of the invention relates to the use of the granular or powder foam control composition X according to the invention for reducing or eliminating foam formation in a liquid.

Another object of the invention relates to a use of the granular or powder foam control composition X according to the invention and as described above in: pulp and paper industry, paints and latex, concretes and mortars, coating processes, agriculture, fertilizers, fermentation processes, metal working, adhesive, caulk and polymer manufacture, oil and gas, plastic recycling, cleaning compounds, detergents, cooling towers, chemical processes and waste water treatment.

The term "hydraulic cement" as used herein includes those inorganic cements which, when mixed with water, set and harden as a result of chemical reactions between the water and the compounds present in the cement.

The term "concrete" as used herein includes a mixture of a hydraulic cements and inert aggregates. Typical aggregates include conventional aggregates such as gravel, sand, granite, limestone, and quartz.

To facilitate a better understanding of the present invention, the following examples of certain aspects of some embodiments are given. In no way should the following examples be read to limit, or define, the scope of the invention.

EXAMPLES

Example 1

Composition 1 obtained by mixing components (I) and (II):
- (I) Polymer A, 70 grams of calcium lignosulfonate liquid (Flambeau River Papers)
- (II) 30 grams of a foam control agent concentrate containing:
  - a) 40% of a mixture of Silcolapse™ 825 & 500, 75:25 by weight %, (Elkem Silicones),
  - b) 25% Tegopren® 5803 (Evonik), and
  - c) 35% Pluronic® L-101 (BASF).

The composition is mixed together using a speed mixer. After about 2 hours of drying using a conventional rotavap and an oil bath at 105° C., a brittle, brown material was produced that was easily ground by mortar and pestle to a dry powder. The yield of this preparation was 64 grams. Based on dry weight, this preparation contains 51% antifoam concentrate and contain, 19% silicone antifoam compound.

Example 2

Polymer A: Aquatreat® AR-540 Copolymer of acrylic acid & sulfonated monomers, (solids content 45%). This primarily acidic (pH 3-4) copolymer should be salified in situ.

Composition 2: (in situ salification of the polymer by an aqueous solution of triethanolamine) obtained by mixing components (I) and (II):
- (I) 70 grams of an aqueous dispersion containing:
  - a) 50 grams Aquatreat AR-540 pH 3-4 (Nouryon)
  - b) 10 grams triethanolamine (79% in water)
  - c) 5 grams Magnesium Sulfate (PQ)
  - d) 5 grams Dioctyl Sulfosuccinate (Dow GR-5M)
- (II) 30 grams antifoam agent concentrate
  - a) 15 grams Silcolapse™ 500 (Elkem Silicones),
  - b) 3 grams Tegopren® 5803 (Evonik)
  - c) 12 grams Polypropylene glycol (PPG) 2000 (Vantage)

The composition is mixed together using a speed mixer. After about 2 hours of drying using a conventional rotavap and an oil bath at 105° C., this produced a slightly clumpy, light yellow material that was easily ground by mortar and pestle to a dry powder. The yield of this preparation was 58.84 grams. Based on dry weight, this preparation contains 51% antifoam agent concentrate and contain, 25.5% silicone antifoam compound.

Example 3

Polymer A: Alcosperse® 747, an acrylic and styrene sulfonate copolymer, sodium salt (solids content 40%); a general structure of the monomers is:

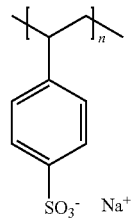

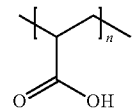

Composition 3 obtained by mixing components (I) and (II):
- (I) 90 grams of a polymer formulation containing:
  - a) 85 grams Alcosperse® 747, pH 8-10 (Nouryon)
  - b) 5 grams Dioctyl Sulfosuccinate (Dow)
- (II) 10 grams antifoam agent concentrate containing:
  - 1) 5 grams Silcolapse™ 500 (Elkem Silicones),
  - 2) 1 gram Tegopren® 5803 (Evonik)
  - 3) 4 grams Polypropylene glycol (PPG) 2000 (Vantage)

The composition is mixed together using a speed mixer. After about 2 hours of drying using a conventional rotavap and an oil bath at 105° C., this produced a smooth, dry, light yellow material that was easily ground by mortar and pestle to a dry powder. The yield of this preparation was 46.36 grams. Based on dry weight, this preparation contains 21.5% antifoam concentrate and contain, 10.8% Silcolapse® 500, silicone antifoam compound.

Example 4

Composition 4 obtained by mixing components (I) and (II):
- (I) 90 grams of a polymer formulation containing:
  - a) 85 grams Alcosperse® AR-747 pH 8-10 (Nouryon), and
  - b) 5 grams Dioctyl Sulfosuccinate (Dow GR-5M).
- (II) 10 grams of a foam control agent concentrate containing:
  - a) 6 grams Silcolapse™ 825/500, 52:48 by weight %, (Elkem Silicones),
  - b) 2 grams Tegopren® 5803 (Evonik), and
  - c) 2 grams Polypropylene glycol (PPG) 2000 (Vantage)

The composition is mixed together using a speed mixer. After about 2 hours of drying using a conventional rotavap and an oil bath at 105° C., this produced a smooth, dry, light yellow material that was easily ground by mortar and pestle to a dry powder. The yield of this preparation was 49.31 grams. Based on dry weight, this preparation contains 20.3% antifoam concentrate and contains 12.2% Silcolapse™ 825/500 (52/48), silicone antifoam compound.

Foam Control Performance Soap:

Foam Control performance was measured using a surfactant system consisting of a 10% tall oil fatty acid (TOFA) soap neutralized to pH 10.5 as the foaming media. A small amount of foam control composition (~0.05-0.1 grams) was added to a 50 mL solution. This was placed in a transparent 16-ounce plastic cup with a lid. The sample was agitated using a wrist action shaker for one minute, then stopped. The time in seconds it takes for the foam to reduce to a 50% clear surface was measured and recorded. This was repeated 7 times. If a result was clearly not going to occur the test was stopped after 300 seconds.

TABLE 1

| TOFA Shake Test | Run 1 | Run 2 | Run 3 | Run 4 | Run 5 | Run 6 | Run 7 | Grams |
|---|---|---|---|---|---|---|---|---|
| Comparative: 15% silicone antifoam powder | 116 | 125 | 200 | 159 | 203 | 265 | 327 | 0.0557 |
| Composition 1 (19% silicone) | 53 | 95 | 125 | 156 | 188 | 250 | 310 | 0.0530 |
| Composition 2 (25% silicone) | 27 | 182 | 216 | 253 | 274 | 300 | 300 | 0.0511 |
| Composition 4 (12% silicone) | 64 | 110 | 166 | 154 | 181 | 254 | 310 | 0.0507 |

TOFA shake test (unit of the results are in second)

Example 5

(I) Polymer: Coadis™ BR 40 by Coatex (Arkema Group) is an acrylic copolymer, potassium salt (solid content 40%).

(II) Composition 5 obtained by mixing components (I) and (II):

(I) 94 grams Coadis™ BR-40

(II) 6 grams antifoam concentrate containing:
   a) 5 grams Silcolapse™ 610/825, 50/50 by weight %, (Elkem Silicones), and
   b) 1 gram Rhodasurf® BC-420 (from Solvay)

The composition is mixed together using a speed mixer. After about 2 hours of drying using a conventional rotavap and an oil bath at 105° C., this produced a smooth, dry, light green material that was easily ground by mortar and pestle to a dry powder. The yield of this preparation was 45.50 grams. Based on dry weight, this preparation contains 13% antifoam concentrate and contains 11% silicone antifoam compound.

Example 6

Polymer A: Coadis™ 123 K (Arkema Group) is an acrylic copolymer, potassium salt; liquid (solid content 24%)

Composition 6 obtained by mixing components (I) and (II):

(I) Polymer A: 156 grams Coadis™ 123 K (II) 6 grams antifoam concentrate containing:
   a) 5 grams Silcolapse™ 610/825, 50/50 by weight %, (Elkem Silicones), and
   b) 1 gram Rhodasurf® BC-420 (Solvay)

The composition is mixed together using a speed mixer. After about 2.5 hours of drying using a conventional rotavap and an oil bath at 105° C., this produced a smooth, dry, light yellow material that was easily ground by mortar and pestle to a dry powder. The yield of this preparation was 45.40 grams. Based on dry weight, this preparation should have 13% antifoam concentrate and contain 11% silicone antifoam compound.

Example 7

Composition 7 obtained by mixing components (I) and (II):

(I) Polymer A: 94 grams Alcosperse® AR-747 (Nouryon)

(II) 6 grams antifoam concentrate containing:
   a) 5 grams Silcolapse™ 610/825, 50/50 by weight %, (Elkem Silicones), and
   b) 1 gram Rhodasurf® BC-420 (Solvay)

The composition is mixed together using a speed mixer. After about 2 hours of drying using a conventional rotavap and an oil bath at 105° C., this produced a smooth, dry, light yellow material that was easily ground by mortar and pestle to a dry powder. The yield of this preparation was 45.50 grams. Based on dry weight, this preparation contains 13% antifoam concentrate and contains 11% silicone antifoam compound.

Example 8

Composition 8 obtained by mixing components (I) and (II):

(I) Polymer A: 72.3 grams calcium lignosulfonate liquid (Mosaico)

(II) 6 grams antifoam concentrate containing:
   a) 5 grams Silcolapse™ 610 (Elkem Silicones), and
   b) 1 gram Rhodasurf® BC-420 (Solvay)

The composition is mixed together using a speed mixer. After about 2 hours of drying using a conventional rotavap and an oil bath at 105° C., this produced a brittle, brown material that was easily ground by mortar and pestle to a dry powder. The yield of this preparation was 43.25 grams. Based on dry weight, this preparation contains 13% antifoam concentrate and contains 11% silicone antifoam compound.

As a comparative test, the same components were mixed but at 50:50 weight percent ratio. After drying, it did not yield to a granular or a powder composition.

Example 9

Composition 9 obtained by mixing components (I) and (II):

(I) Polymer A: 80.3 grams ammonium lignosulfonate liquid (Borregard/LignoTech)

(II) 6 grams antifoam concentrate containing:
   a) 5 grams Silcolapse 610™ (from Elkem Silicone), and
   b) 1 gram Rhodasurf® BC-420 (from Solvay)

The composition is mixed together using a speed mixer. After about 2 hours of drying using a conventional rotavap and an oil bath at 105° C., this produced a brittle, brown material that was easily ground by mortar and pestle to a dry powder. The yield of this preparation was 45.93 grams. Based on dry weight, this preparation contains 13% antifoam concentrate and contains 11% silicone antifoam compound.

Foam Control Performance Agrochemical:

Foam Control performance was measured using a 36% potassium glyphosate system. A sample of powder (0.01 to 0.02 gram) was dissolved/dispersed into a 36% solution of potassium glyphosate. A one-gram aliquot of this material was diluted with 35 grams of deionized water to bring it to a 1% use concentration. This was placed in a transparent 16-ounce plastic cup with a lid. The sample was agitated using a wrist action shaker for one minute, then stopped. The time in seconds it takes for the foam to reduce to a 50% clear surface was measured and recorded. This was repeated 8 times. If a result was clearly not going to occur the test was stopped after 300 seconds.

TABLE 2

Foam Control Performance Agrochemical (unit of the results are in second)

|  |  | Run 1 | Run 2 | Run 3 | Run 4 | Run 5 | Run 6 | Run 7 | Run 8 | Grams |
|---|---|---|---|---|---|---|---|---|---|---|
| Control (without any antifoam) | 50% clear time | 287 | 300 | 300 | 300 | 300 | 300 | 300 | 300 | 0 |
| Composition 5 | 50% clear time | 14 | 31 | 55 | 110 | 105 | 115 | 136 | 163 | 0.02 |
| Composition 7 | 50% clear time | 143 | 300 | 300 | 300 | 300 | 300 | 300 | 300 | 0.01 |
| Composition 10 | 50% clear time | 146 | .300 | 300 | 300 | 300 | 300 | 300 | 300 | 0.02 |

Example 10

Composition 10 obtained by mixing components (I) and (II):
  (I) Polymer A: 159.07 grams sodium lignosulfonate liquid (Borregard/LignoTech)
  (II) 12 grams antifoam concentrate containing:
    a) 10 grams Silcolapse™ 610 (Elkem Silicones), and
    b) 2 grams Rhodasurf® BC-420 (Solvay)

The composition is mixed together using a speed mixer. After about 3 hours of drying using a conventional rotavap and an oil bath at 105° C., this produced a brittle, dark brown material that was easily ground by mortar and pestle to a dry powder. The yield of this preparation was 92.00 grams. Based on dry weight, this preparation contains 13% antifoam concentrate and contains 11% silicone antifoam compound.

Example 11

Composition 11 obtained by mixing components (I) and (II):
  (I) Polymer A: 55 grams calcium lignosulfonate liquid (Mosaico)
  (II) 45 grams antifoam emulsion, Silcolapse™ 495, high performance antifoam emulsion—25% active silicone emulsion, (Elkem Silicones)

The composition is mixed together using a speed mixer. After about 2.5 hours of drying using a conventional rotavap and an oil bath at 105° C., this produced a brittle, brown material that was easily ground by mortar and pestle to a dry powder. The yield of this preparation was 44.64 grams. Based on dry weight, this preparation contains 25% silicone antifoam actives.

Example 12

Composition 12 obtained by mixing components (I) and (II):
  (I) Polymer A: 72.3 grams calcium lignosulfonate liquid (Mosaico)
  (II) 6 grams antifoam concentrate containing:
    a) 5 grams Silcolapse™ 610/825, 50/50 by weight %, (Elkem Silicones), and
    b) 1 gram Rhodasurf® BC-420 (Solvay)

The composition is mixed together using a speed mixer. After about 2 hours of drying using a conventional rotavap and an oil bath at 105° C., this produced a brittle, brown material that was easily ground by mortar and pestle to a dry powder. The yield of this preparation was 43.01 grams. Based on dry weight, this preparation should have 13% antifoam concentrate and contains 11% silicone antifoam compound.

Example 13

Composition 13 obtained by mixing components (I) and (II):
  (I) Polymer A: 94 grams Alcosperse® AR-747 (Nouryon)
  (II) 6 grams antifoam concentrate containing:
    a) 5 grams Silcolapse™ 490/825 50/50 by weight %, (Elkem Silicones), and
    b) 1 gram Rhodasurf® BC-420 (Solvay)

The composition is mixed together using a speed mixer. After about 2 hours of drying using a conventional rotavap and an oil bath at 105° C., this produced a smooth, dry, light yellow material that was easily ground by mortar and pestle to a dry powder. The yield of this preparation was 44.31 grams. Based on dry weight, this preparation contains 13% antifoam concentrate and contains 11% silicone antifoam compound.

Foam Control Performance Cementing:

A typical cement formulation used in oil well cementing was prepared using API class G cement, a carboxylated styrene butadiene emulsion, and a dispersant (super plasticizer), polynaphtalenesulfonate and water. The components 337 grams water, 2.1 grams dispersant, 36 grams emulsion, 198 grams cement and 3 grams of antifoam powder were placed in a Chandler constant speed mixer and mixed at 13000 RPM. The mixture was placed in a one-liter graduated cylinder and foam level was measured at initial time and 15 minutes. The foam height at both times was measured for a control containing no antifoam and each example.

TABLE 3

Foam Control Performance Cementing.

| | Volume of Cement (mL) | |
|---|---|---|
| | 0 min | 15 min |
| Control Without antifoam | 800 | 685 |
| Composition 10 | 785 | 475 |
| Composition 8 | 785 | 500 |
| Composition 11 | 755 | 695 |
| Composition 12 | 715 | 455 |
| Composition 7 | 625 | 442.5 |
| Composition 13 | 670 | 447.5 |
| Commercial cement antifoam powder | 765 | 680 |

The data shows that no antifoam in the cement creates 800 mLs of volume that slowly dissipates (defoams) to 685 mLs. Example 10 and 8 reduce the initial foam slightly compared to the control 785 mLs, respectively; however, the cement volume reduces significantly over 15 minutes to 475 and 500 mLs, respectively. Foam reduction is very important in order to reduce entrained air which increases cement strength. Compositions 11 and 12 perform better as an antifoam as the initial volumes, 755 and 715 mLs, respectively, are lower than compositions 8 and 10. Composition 12 also performs better after 15 minutes with a final volume of 455 mLs.

Compositions 7 and 13 show the best overall performance with an initial volume of 625 and 670 mLs, respectively. A competitive example silicone antifoam powder used in cementing showed very modest, 765 mLs initial and 680 mLs final volume, respectively, performance in this test relative to the instant invention.

Foam Control Performance Washing Machine Detergent:

Detergent foam control was measured using a front-loading washing machine. A typical powder detergent was formulated with 0.1% powder antifoams. A 0.8 gram/L dose of detergent with antifoams and without was added to the washing machine containing 40° C. water. The height of the foam was measured as a percentage of the window filled with foam. The height was measured every 5 minutes for a total of 25 minutes.

TABLE 4

Foam Control Performance Washing Machine Detergent:

| | Foam height (%) | | | | | |
|---|---|---|---|---|---|---|
| Time (min) | 0 | 5 | 10 | 15 | 20 | 25 |
| without Anti Foam | 14 | 42.5 | 55 | 55 | 53.5 | 54 |
| Composition 10 | 10 | 20 | 29 | 32 | 35 | 40 |
| Composition 8 | 7.5 | 15 | 22 | 28 | 30 | 40 |
| Composition 12 | 0 | 5 | 17.5 | 21 | 23.5 | 30 |
| Composition 11 | 0 | 15 | 22 | 23.5 | 25 | 32 |
| Composition 7 | 0 | 7.5 | 16.5 | 20 | 23.5 | 30 |
| Composition 13 | 5 | 12.5 | 20 | 22 | 25 | 30 |
| Commercial Anti Foam powder with zeolite as solid carrier | 0 | 16.5 | 25 | 29 | 31 | 39 |
| Commercial Anti Foam powder with sodium carbonate as solid carrier | 16.5 | 39 | 47.5 | 49 | 47.5 | 48.5 |

Examples 14-19

In Examples 1-13, the primary silicone component in foam control agent B was linear, branched or a combination based on polydimethylsiloxane. Further example compositions of different silicones were formulated into foam control agent B. These foam control agents were formulated with about 9% PDMS treated silica. The silicas were a combination of 3% PDMS treated fumed silica, AMSiI™ H22, and 6% PDMS treated precipitated silica, AMSiI™ 35. Additionally, a small amount of stearic acid was added. For the purposes of examples, foam control agent B was made using Tegopren™ 5852 and Tegopren™ 5803 (from Evonik), polyether silicones, Bluesil™ FLD Extrasoft (from Elkem), amino silicone, Bluesil™ FLD 308V750, alkyl silicone, Bluesil™ FLD 550 (from Elkem), aryl silicone, and FMS 131 (from Gelest), fluorosilicone. These silicone polymers were mixed with the combination of PDMS treated fumed silica and precipitated silica, and the stearic acid to make 800 grams total as described below. The 800 grams was initially speed mixed using a speed mixer (Flack-Tek), then processed for 6-10 minutes, depending on viscosity, using a rotor stator type mill (from GreerCo). The mixtures were heat treated about 3 hours at 120° C.

TABLE 5

Foam Control Agents using different silicone polymers:

| Percent | Material | 14 | 15 | 16 | 17 | 18 | 19 |
|---|---|---|---|---|---|---|---|
| 3.0% | AMSil H22 | 24.0 | 24.0 | 24.0 | 24.0 | 24.0 | 24.0 |
| 6.0% | AMSil 35 | 48.0 | 48.0 | 48.0 | 48.0 | 48.0 | 48.0 |
| 0.1% | Stearic Acid | 0.8 | 0.8 | 0.8 | 0.8 | 0.8 | 0.8 |
| 90.9% | Tegopren 5852 | 727.2 | | | | | |
| 90.9% | Tegopren 5803 | | 727.2 | | | | |
| 90.9% | Bluesil FLD Extrasoft | | | 727.2 | | | |
| 90.9% | Bluesil FLD 308V750 | | | | 727.2 | | |
| 90.9% | Bluesil FLD 550 | | | | | 727.2 | |
| 90.9% | FMS-131 | | | | | | 727.2 |
| | | 800.0 | 800.0 | 800.0 | 800.0 | 800.0 | 800.0 |

Examples 20-26

Composition 20-26 obtained by mixing components (I) and (II) and (III):

(I) Polymer A, 72.3 grams of calcium lignosulfonate liquid (Borregaard/Lignotech)

(II) 5 grams of each foam control agent B from Examples 14-19 as well as Silcolapse 610.

(III) 1 gram of surfactant Ethal TDA-3 (Ethox)

The composition is mixed together using a speed mixer. After about 2 hours of drying using a conventional rotavap and an oil bath at 105° C., a brittle, brown material was produced that was easily ground by mortar and pestle to a dry powder. The yield of each preparation was about 42 grams. Based on dry weight, this preparation contains about 12% silicone antifoam compound.

Foam Control Performance Soap:

Foam Control performance for Examples 20-26 were again measured using a surfactant system consisting of a 10% tall oil fatty acid (TOFA) soap neutralized to pH 10.5 as the foaming media. In this experiment, 0.5 grams was added to a 50 mL solution. This was placed in a transparent 16-ounce plastic cup with a lid. The sample was agitated using a wrist action shaker for one minute, then stopped. The time in seconds it takes for the foam to be reduced to the liquid layer was measured and recorded. This was repeated 7 times. If a result was clearly not going to occur the test was stopped after 300 seconds.

TABLE 6

Foam Control Performance in Soap using different silicone polymers:

| TOFA Shake Test | Run 1 | Run 2 | Run 3 | Run 4 | Run 5 | Run 6 | Run 7 | Run 8 |
|---|---|---|---|---|---|---|---|---|
| Composition 20 - Silcolapse 610 | 125 | 260 | 300 | 300 | 300 | 300 | 300 | 300 |
| Composition 21 - Example 14 compound | 300 | 300 | 300 | 300 | 300 | 300 | 300 | 300 |

TABLE 6-continued

Foam Control Performance in Soap using different silicone polymers:

| TOFA Shake Test | Run 1 | Run 2 | Run 3 | Run 4 | Run 5 | Run 6 | Run 7 | Run 8 |
|---|---|---|---|---|---|---|---|---|
| Composition 22 - Example 15 compound | 300 | 300 | 300 | 300 | 300 | 300 | 300 | 300 |
| Composition 23 - Example 16 compound | 300 | 300 | 300 | 300 | 300 | 300 | 300 | 300 |
| Composition 24 - Example 17 compound | 85 | 200 | 250 | 300 | 300 | 300 | 300 | 300 |
| Composition 25 - Example 18 compound | 80 | 120 | 190 | 280 | 280 | 300 | 300 | 300 |
| Composition 26 - Example 19 compound | 300 | 300 | 300 | 300 | 300 | 300 | 300 | 300 |

In all cases, even though a 300 was measured some amount of foam control performance was observed with all example materials.

Foam Control Performance Cementing:

A typical cement formulation used in oil well cementing was prepared using API class G cement, a carboxylated styrene butadiene emulsion, and a dispersant (super plasticizer), polynaphtalenesulfonate and water. The components 337 grams water, 2.1 grams dispersant, 36 grams emulsion, 198 grams cement and 3 grams of antifoam powder were placed in a Chandler constant speed mixer and mixed at 13000 RPM. The mixture was placed in a one-liter graduated cylinder and foam level was measured at initial time and 15 minutes. The foam height at both times was measured for a control containing no antifoam and each example.

TABLE 7

Foam Control Performance in Cement using different silicone polymers:

| | Volume of Cement (mL) | |
|---|---|---|
| | 0 min | 15 min |
| Composition 20 - Silcolapse 610 | 745 | 455 |
| Composition 21 - Example 14 compound | 770 | 555 |
| Composition 22 - Example 15 compound | 690 | 440 |
| Composition 23 - Example 16 compound | 845 | 700 |
| Composition 24 - Example 17 compound | 715 | 470 |
| Composition 25 - Example 18 compound | 800 | 475 |
| Composition 26 - Example 19 compound | 775 | 530 |

Examples 27-29

Composition 27-29 obtained by mixing components (I) and (II) and (III):
(I) Polymer A, 188 grams of Alcosperse 747 liquid (Nouryon)
(II) 10 grams of each foam control agent B from Examples 14, 15 & 18
(III) 2 gram of surfactant Ethal TDA-3 (Ethox)

The composition is mixed together using a speed mixer. After about 2.5 hours of drying using a conventional rotavap and an oil bath at 105° C., a brittle, off white material was produced that was easily ground by mortar and pestle to a dry powder. The yield of each preparation was about 170 grams. Based on dry weight, this preparation contains about 11.5% silicone antifoam compound.

Examples 30-32

Composition 30-32 obtained by mixing components (I) and (II) and (III):
(I) Polymer A, 216.2 grams of Alcosperse 747 liquid (Nouryon)
(II) 11.5 grams of each foam control agent B from Examples 16, 17 & 19
(III) 2.3 gram of surfactant Ethal TDA-3 (Ethox)

The composition is mixed together using a speed mixer. After about 2.5 hours of drying using a conventional rotavap and an oil bath at 105° C., a brittle, off white material was produced that was easily ground by mortar and pestle to a dry powder. The yield of each preparation was about 190 grams. Based on dry weight, this preparation contains about 11.5% silicone antifoam compound.

TABLE 8

Foam Control Performance in Detergent using different silicone polymers:

| | Foam height (%) | | | | | |
|---|---|---|---|---|---|---|
| Time (min) | 0 | 5 | 10 | 15 | 20 | 25 |
| Control | 20 | 45 | 60 | 60 | 60 | 63 |
| Composition 27 - Example 14 compound | 25 | 46 | 59 | 61 | 63 | 63 |
| Composition 28 - Example 15 compound | 20 | 45 | 58 | 59 | 60 | 62 |
| Composition 30 - Example 16 compound | 21 | 41 | 58 | 54 | 50 | 54 |
| Composition 31 - Example 17 compound | 20 | 21 | 24 | 25 | 28 | 28 |
| Composition 29 - Example 18 compound | 17 | 19 | 21 | 25 | 25 | 38 |
| Composition 32 - Example 19 compound | 14 | 20 | 20 | 21 | 22 | 28 |

Examples 33-40

Composition 33-40 obtained by mixing components (I) and (II) and (III):
(I) Polymer A, 94.0 grams Coadis™ BR 40 by Coatex (Arkema Group) acrylic copolymer, potassium salt (II) 5 grams of each foam control agent B from Examples 14-19, as well as Silcolapse 482 and Silcolapse 610 (Elkem).
(III) 1 gram of surfactant Ethal TDA-3 (Ethox)

The composition is mixed together using a speed mixer. After about 2 hours of drying using a conventional rotavap and an oil bath at 105° C., this produced a smooth, dry, light green material that was easily ground by mortar and pestle to a dry powder. The yield of each preparation was about 42 grams. Based on dry weight, this preparation contains about 12% silicone antifoam compound.

Foam Control Performance Agrochemical:

Foam control performance and media compatibility was measured using a 41% isopropylamine glyphosate system containing 12% alkylpolyglucoside surfactant. A 0.1% sample of powder was dissolved/dispersed into a 41% solution of isopropylamine glyphosate. A 50 mL aliquot of this mixtures was inverted by hand using CIPAC method MT-47. The foam height was observed and recorded over time in seconds. The data was tabulated.

Comparative Example 1

A comparative powder foam control example was tested using the above test method. Silcolapse™ EP 6703 (from Elkem Silicones) was a 25% silicone foam control powder that was coated onto a solid particulate starch carrier. This was compared to compositions 33-40.

polymers using the foam control compositions of the instant invention in the isopropylamine glyphosate media.

Composition 41-43 show that high amounts of foam control agent B can be incorporated into a powder antifoam while still maintaining a dry feel.

Composition 41 obtained by mixing components (I) and (II):
(I) Polymer A: 80 grams calcium lignosulfonate liquid (from Mosaico)
(II) Foam control agent B: 20 grams Silcolapse™ 610 (Elkem Silicones), The composition is mixed together using a speed mixer. After about 2 hours of drying using a conventional rotavap and an oil bath at 105° C., this produced a brittle, brown material that was easily ground by mortar and pestle to a dry powder. The yield of this preparation was 61.81 grams. Based on dry weight, this preparation should have 32% silicone antifoam compound.

Composition 42 obtained by mixing components (I) and (II):
(I) Polymer A: 75 grams calcium lignosulfonate liquid (Mosaico)
(II) Foam control agent B: 25 grams Silcolapse™ 610 (Elkem Silicones), The composition is mixed together using a speed mixer. After about 2 hours of drying using a conventional rotavap and an oil bath at 105° C., this produced a slightly soft,

TABLE 9

Foam Control Performance in Agrochemical

| Time (seconds) | Comparative Ex 1 | Composition 33 - Example 14 Compound | Composition 34 - Example 15 Compound | Composition 35 - Example 16 Compound | Composition 36 - Example 17 Compound | Composition 37 - Example 18 Compound | Composition 38 - Example 19 Compound | Composition 39 - Silcolapse 482 Compound | Composition 40 - Silcolapse 610 Compound |
|---|---|---|---|---|---|---|---|---|---|
| 0 | 270 | 290 | 290 | 290 | 270 | 290 | 275 | 270 | 270 |
| 10 | 74 | 98 | 100 | 100 | 78 | 90 | 82 | 62 | 53 |
| 20 | 67 | | 96 | 98 | 74 | 86 | 79 | 59 | 50 |
| 30 | 61 | 90.5 | 95 | 96 | 73 | 85 | 78 | 56 | 48 |
| 45 | 59.5 | | | 93 | 72 | 84 | 78 | | 47 |
| 60 | 54 | 87 | 94 | 92 | 72 | 84 | 77 | 50 | 46 |
| 90 | 48 | | | 92 | | | 77 | 43 | 45 |
| 120 | 43 | | 90 | 92 | 70 | | 76 | 39 | 44 |
| 180 | 37 | 87 | 90 | 92 | 70 | 83 | | 29 | 42 |
| 240 | | | | 92 | 70 | | | 23 | 38 |
| 300 | 33 | | 86 | | | 81 | 75 | | |
| 360 | | | 88 | | 70 | | | | 31 |
| 420 | | | | | | 81 | | 21 | |
| 480 | | | 86 | 88 | 70 | | | 18 | |
| 540 | | | | | | | | | 28 |
| 600 | 29 | | 86 | | | | | | |
| 660 | | | | 84 | | | | | |
| 720 | 27 | 86 | | | 70 | | 73 | 16 | 26 |

| | Comparative Ex 1 | Composition 33 - Example 14 Compound | Composition 34 - Example 15 Compound | Composition 35 - Example 16 Compound | Composition 36 - Example 17 Compound | Composition 37 - Example 18 Compound | Composition 38 - Example 19 Compound | Composition 39 - Silcolapse 482 Compound | Composition 40 - Silcolapse 610 Compound |
|---|---|---|---|---|---|---|---|---|---|
| Compatibility | slightly cloudy with floating particulates | Clear solution | Clear solution | slightly cloudy with floating particulates | cloudy with floating particulates | cloudy with floating particulates | Clear solution | Clear solution | Clear solution |

Compositions 39 and 40 show that at about half the silicone loading (~12%) foam control is equal to or better than the comparative example 1 having 25% silicone loading. Compatibility is improved for most types of silicone brown material that was easily ground by mortar and pestle to a dry powder. The yield of this preparation was 68.89 grams. Based on dry weight, this preparation should have 36% silicone antifoam compound.

Composition 43 obtained by mixing components (I) and (II):
- (I) Polymer A: 70 grams calcium lignosulfonate liquid (Mosaico)
- (II) Foam control agent B: 30 grams Silcolapse™ 610 (Elkem Silicones), The composition is mixed together using a speed mixer. After about 2 hours of drying using a conventional rotavap and an oil bath at 105° C., this produced a soft, brown material that was easily ground by mortar and pestle to a dry powder. The yield of this preparation was 70.85 grams. Based on dry weight, this preparation should have 42% silicone antifoam compound.

Composition 44 show that amino acid polymers can be used as polymer A and be mixed with foam control agent B to form a powder antifoam.

Composition 44 obtained by mixing components (I) and (II):
- (I) Polymer A: 94 grams sodium polyaspartic acid (from Shandong Yuanlian)
- (II) Foam control agent B: 5 grams Silcolapse™ 610 (from Elkem Silicones),
- (III) 1 gram of surfactant Rhodasurf™ BC-420 TDA-3 (from Solvay)

The composition is mixed together using a speed mixer. After about 2 hours of drying using a conventional rotavap and an oil bath at 105° C., this produced a brittle, light brown material that was easily ground by mortar and pestle to a dry powder. The yield of this preparation was 46.10 grams. Based on dry weight, this preparation should have 11% silicone antifoam compound.

We claim:

1. A method for preparing a foam control composition X in a granular or a powder form, said process comprising the steps of:
   a) providing an aqueous dispersion, an aqueous solution or an aqueous concentrate in a liquid form comprising at least one water-soluble or water-dispersible organic polymer A bearing polyacid groups or polyamino groups which is partially salified, or fully salified;
   b) mixing said aqueous dispersion, said aqueous solution or said aqueous concentrate comprising said water-soluble or water-dispersible organic polymer A with a foam control agent B which is provided either as a liquid concentrate, as an aqueous dispersion or as an emulsion to form a liquid mixture, and wherein said components are added so that the water-soluble or water-dispersible organic polymer A to foam control agent B weight percent ratio is from 99.9:0.1 to 55:45, and
   c) drying the resulting liquid mixture to recover the granular or powder foam control composition X comprising the polymer A and the foam control agent B wherein the water-soluble or water-dispersible organic polymer A to foam control agent B weight percent ratio is from 99.9:0.1 to 55:45,
   wherein the polymer A is selected from the group consisting of lignosulfonate salts, copolymers of acrylic acid and 2-acrylamido-2-methylpropane-sulfonic acid in their corresponding partially or fully salified forms, copolymers of acrylic acid and styrene sulfonate in their corresponding partially or fully salified forms, and mixtures thereof.

2. The method according to claim 1 wherein said foam control agent B is free of said polymer A.

3. The method according to claim 1 wherein the foam control agent B is selected from the group consisting of silicone antifoaming agents; alkoxylated alcohols; ethylene oxide/propylene oxide block copolymers; organic esters of ethylene oxide/propylene oxide block copolymers; organic esters of polyethylene glycol; polypropylene glycol; mixtures of organic esters of polyethylene glycol and polypropylene glycol; hydrophobic silica; and mixtures thereof.

4. The method according to claim 1 wherein the foam control agent B is a silicone defoaming agent in combination with a hydrophobic silica.

5. The method according to claim 1 wherein in step b) a surfactant is mixed with said aqueous dispersion, said aqueous solution or said aqueous concentrate comprising polymer A and foam control agent B to form the liquid mixture.

6. The method according to claim 1 wherein a spray dryer is used in step c) for drying the resulting mixture.

* * * * *